United States Patent
Muthiah (10) Patent No.: US 10,897,627 B2
(45) Date of Patent: Jan. 19, 2021

(54) NON-VOLATILE MEMORY SYSTEM INCLUDING A PARTIAL DECODER AND EVENT DETECTOR FOR VIDEO STREAMS

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/929,090

(22) Filed: Jan. 11, 2019

(65) Prior Publication Data

US 2020/0228812 A1  Jul. 16, 2020

(51) Int. Cl.
*H04N 19/44* (2014.01)
*H04N 19/119* (2014.01)
*H04N 19/142* (2014.01)
*G06K 9/00* (2006.01)
*H04N 21/6336* (2011.01)

(52) U.S. Cl.
CPC .......... *H04N 19/44* (2014.11); *G06K 9/00221* (2013.01); *H04N 19/119* (2014.11); *H04N 19/142* (2014.11); *H04N 21/6336* (2013.01)

(58) Field of Classification Search
None
See application file for complete search history.

(56) References Cited

U.S. PATENT DOCUMENTS

| 5,099,150 | A | * | 3/1992 | Steele | ............ H03K 19/17704 326/38 |
|---|---|---|---|---|---|
| 6,542,075 | B2 | | 4/2003 | Barker et al. | |
| 6,768,661 | B2 | | 7/2004 | Vyvoda et al. | |
| 7,631,327 | B2 | | 12/2009 | Dempski et al. | |
| 7,760,230 | B2 | | 7/2010 | Russell et al. | |
| 7,847,820 | B2 | | 12/2010 | Vallone et al. | |
| 8,412,783 | B2 | | 4/2013 | Boston et al. | |
| 8,516,019 | B2 | | 8/2013 | Hunt et al. | |
| 8,676,027 | B2 | | 3/2014 | Hugosson | |
| 8,725,940 | B2 | | 5/2014 | Grube et al. | |
| 8,825,721 | B2 | | 9/2014 | Hunt et al. | |
| 9,037,921 | B1 | | 5/2015 | Brooker et al. | |
| 9,215,423 | B2 | | 12/2015 | Kimble et al. | |
| 9,414,109 | B2 | | 8/2016 | Cheng et al. | |
| 9,489,580 | B2 | | 11/2016 | Laska et al. | |
| 9,781,479 | B2 | | 10/2017 | Klappert et al. | |
| 9,836,248 | B2 | | 12/2017 | Zhang et al. | |

(Continued)

FOREIGN PATENT DOCUMENTS

| EP | 1173020 A2 | 1/2002 |
|---|---|---|
| EP | 1173020 A3 | 7/2002 |

(Continued)

OTHER PUBLICATIONS

U.S. Appl. No. 16/708,091, filed Dec. 2019, Muthiah et al.

(Continued)

*Primary Examiner* — Christopher Braniff
(74) *Attorney, Agent, or Firm* — Brinks Gilson & Lione (57) ABSTRACT

A partial decoder and event detection logic are deployed in a non-volatile memory system to offload processing from a host system while maintaining high video recording performance and backward compatibility with conventional host system logic.

19 Claims, 7 Drawing Sheets

(56) References Cited

U.S. PATENT DOCUMENTS

| | | | |
|---|---|---|---|
| 10,007,442 B2 | 6/2018 | Hahn et al. | |
| 10,095,445 B2 | 10/2018 | De et al. | |
| 10,228,854 B2 | 3/2019 | Romanovsky et al. | |
| 2001/0044856 A1 | 11/2001 | Agesen et al. | |
| 2006/0190419 A1 | 8/2006 | Bunn et al. | |
| 2009/0319255 A1 | 12/2009 | Vengerov | |
| 2015/0237351 A1 | 8/2015 | Lee et al. | |
| 2016/0345009 A1 | 11/2016 | Zhong et al. | |
| 2017/0285968 A1 | 10/2017 | Jung et al. | |
| 2018/0068540 A1* | 3/2018 | Romanenko | G06K 9/3233 |
| 2018/0189635 A1 | 7/2018 | Olarig et al. | |
| 2019/0104341 A1 | 4/2019 | Catalano et al. | |
| 2019/0243754 A1 | 8/2019 | Yu et al. | |
| 2019/0246130 A1* | 8/2019 | Sheikh | H04N 19/11 |

FOREIGN PATENT DOCUMENTS

| | | |
|---|---|---|
| EP | 2141928 A1 | 1/2010 |
| JP | 2010-161740 A | 7/2010 |
| WO | WO2015/154549 A1 | 10/2015 |
| WO | WO2017/134110 A1 | 8/2017 |

OTHER PUBLICATIONS

U.S. Appl. No. 16/818,452, filed Mar. 2020, Muthiah et al.
U.S. Appl. No. 16/781,717, filed Feb. 2020, Muthiah et al.
U.S. Appl. No. 16/670,112, filed Oct. 2019, Muthiah et al.
European Search Report in EP Application No. 19216071.1, dated Feb. 7, 2020, 8 pages.
"Data differencing"; Wikipedia entry; downloaded from the Internet at https://en.wikipedia.org/wiki/Data_differencing on Aug. 6, 2019; 3 pages.
"H.264/MPEG-4 AVC"; Wikipedia entry; downloaded from the Internet at https://en.wikipedia.org/wiki/H.264/MPEG-4_AVC on Aug. 6, 2019; 18 pages.
"Video compression picture types"; Wikipedia entry; downloaded from the Internet at https://en.wikipedia.org/wiki/Video_compression_picture_types on Aug. 6, 2019; 4 pages.
U.S. Appl. No. 15/929,090, filed Jan. 11, 2019.
U.S. Appl. No. 16/781,717, filed Feb. 4, 2020 entitled "Storage System and Method for Optimized Surveillance Search."
U.S. Appl. No. 16/781,688, filed Feb. 4, 2020 entitled "Storage System and Method for Automatic Data Phasing."
"Trick mode"; Wikipedia entry; downloaded from the Internet at https://en.wikipedia.org/wiki/Trick_mode on Jul. 22, 2019; 1 page.
"MPEG transport stream"; Wikipedia entry; downloaded from the Internet at https://en.wikipedia.org/wiki/MPEG_transport_stream on Jul. 22, 2019; 6 pages.
Singh, S. et al.; "Real-Time Implementation of Change Detection for Automated Video Surveillance System"; Research article; ISRN Electronics, vol. 2013, Article ID 691930; 5 pages; Jun. 11, 2013.
U.S. Appl. No. 16/708,091, filed Dec. 9, 2019 entitled "Storage System and Method for Video Frame Segregation to Optimize Storage."

* cited by examiner

NON-VOLATILE MEMORY SYSTEM INCLUDING A PARTIAL DECODER AND EVENT DETECTOR FOR VIDEO STREAMS

BACKGROUND

In conventional video processing systems a host system manages the recording and decoding of raw video streams from video cameras (raw video stream herein also refers to streams including audio). A raw video stream refers to the video signal output by a video codec, and a video codec refers to logic to reduce the storage and communication bandwidth requirements for video signals using various data compression techniques. The host system writes the raw video streams to a non-volatile memory system where they are recorded for possible later review or further processing. A non-volatile memory system refers to a memory device including non-volatile memory, that communicates with a host system, for example, over a memory/storage bus. Control of the video cameras, such as the captured video resolution, pan, tilt, and zoom, is also managed by the host system.

The host system may fully decode the raw video streams in real-time (as received) in order to detect operational events such as motion by people or objects or to perform facial recognition. Detection of an operational event may cause the host system to control the video cameras to increase resolution, pan, title, zoom, etc. This conventional approach to video processing increases stress on the data processing and power resources of the host system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Reference is made herein to example video codecs (e.g., MPEG video codecs) that utilize I (intra) frame, P (predicted) frames, and B (bi-directional frames). I frames are frames encoded using intraframe encoding; P frames are encoded using motion compression using past I frames or past P frames; and B frames are encoded using motion compression by either past or future I frames or P frames. Although used as examples, the techniques disclosed herein are not limited to use with codecs utilizing such frames.

Figure 1:
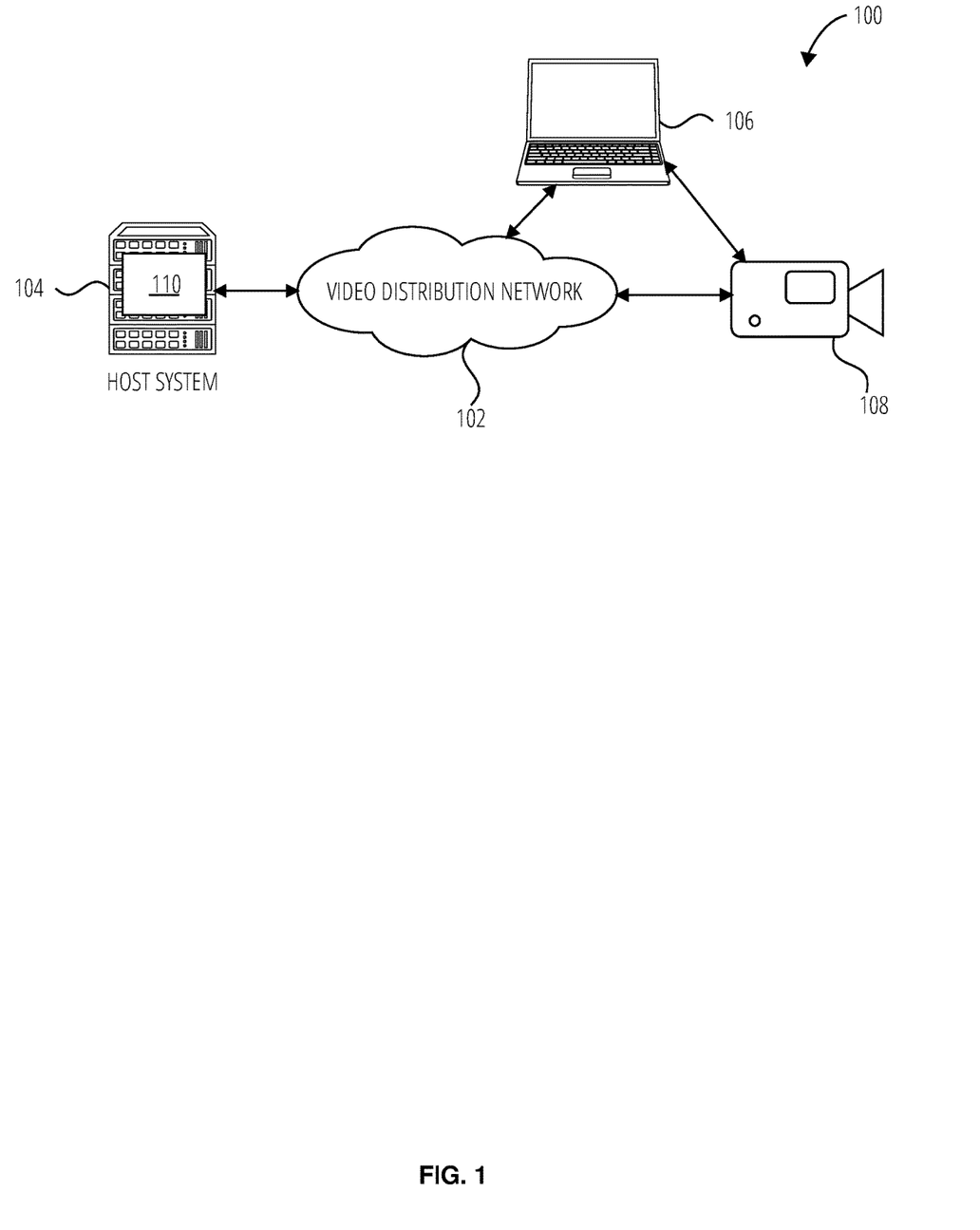
FIG. 1 illustrates a simplified system 100 in which a host system 104 and a supervisor device 106 are communicatively coupled via a video distribution network 102.

FIG. 1 illustrates a system 100 in which a host system 104 and a supervisor device 106 are connected to a video distribution network 102 over which one or more raw video stream generated by one or more video camera 108 is communicated. The supervisor device 106 is optional and may be utilized, for example, to monitor the output of the one or more video camera 108 in real-time.

In various embodiments, the video distribution network 102 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the video distribution network 102 may also include a voice network that conveys not only voice communications, but also non-voice data such as Short Message Service ("SMS") messages, as well as data communicated via various cellular data communication protocols, and the like.

In various embodiments, the supervisor device 106 may include desktop PCs, mobile phones, laptops, tablets, wearable computers, or other computing devices that are capable of connecting to the video distribution network 102 and communicating with the host system 104, which in some embodiments is a video surveillance server comprising host system logic 110. Generally the host system 104 is any one or more computer system meeting the performance requirements of the particular implementation, such as for storing one or more raw video streams.

In various embodiments, additional infrastructure (e.g., short message service centers, cell sites, routers, gateways, firewalls, and the like), as well as additional devices may be present. Further, in some embodiments, the functions described as being provided by some or all of the host system 104 and the supervisor device 106 may be implemented via various combinations of physical and/or logical devices. However, it is not necessary to show such infrastructure and implementation details in FIG. 1 in order to describe an illustrative embodiment.

Figure 2:
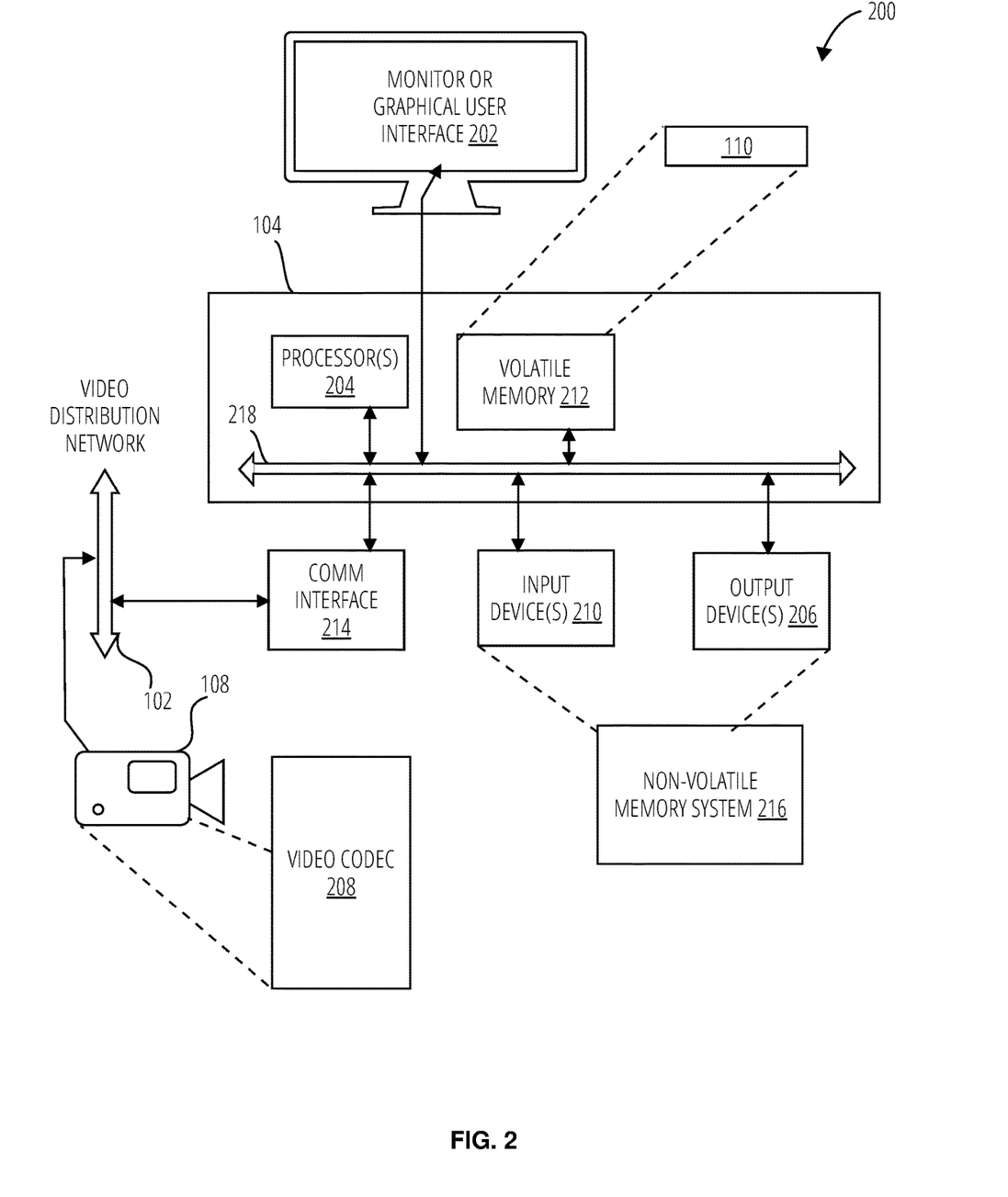
FIG. 2 is an example block diagram of a computing device 200 that may incorporate embodiments of the present invention.

FIG. 2 is an example block diagram of a computing device 200 that may incorporate embodiments of the present invention. For example, the host system 104 may be implemented by an embodiment of the computing device 200. FIG. 2 is merely illustrative of a machine system to carry out aspects of the technical processes described herein, and does not limit the scope of the claims. One of ordinary skill in the art would recognize other variations, modifications, and alternatives. In one embodiment, the computing device 200 typically includes a monitor or graphical user interface 202, a host system 104, a communication network interface 214, input device(s) 210, output device(s) 206, and the like.

As depicted in FIG. 2, the host system 104 may include one or more processor(s) 204 that communicate with a number of peripheral devices via a bus subsystem 218 or the video distribution network 102. These peripheral devices may include input device(s) 210, output device(s) 206, communication network interface 214, and a storage subsystem, such as a volatile memory 212 and a non-volatile memory system 216. The video camera 108 in this example is both an input device and an output device. Inputs to the video camera 108 include controls for one or more of zoom, pan, tilt, focus, and resolution of the video codec 208 utilized by the video camera 108. Many video cameras implement more than one video codec 208 and so the control inputs to a video camera 108 of this type may include a selection of which video codec 208 to use in operation. The video camera 108 outputs include at least a raw video stream.

The volatile memory 212 and/or the non-volatile memory system 216 may store computer-executable instructions and thus forming host system logic 110 that when applied to and executed by the processor(s) 204 implement embodiments of the processes disclosed herein. The non-volatile memory system 216 in this example may function as both an input device for storing a raw video stream and an output device for detecting events, as described more fully below.

The input device(s) 210 include devices and mechanisms for inputting information to the host system 104. These may include a keyboard, a keypad, a touch screen incorporated into the monitor or graphical user interface 202, audio input devices such as voice recognition systems, microphones, and other types of input devices. In various embodiments, the input device(s) 210 may be embodied as a computer mouse, a trackball, a track pad, a joystick, wireless remote, drawing tablet, voice command system, eye tracking system, and the like. The input device(s) 210 typically allow a user to select objects, icons, control areas, text and the like that appear on the monitor or graphical user interface 202 via a command such as a click of a button or the like.

The output device(s) 206 include devices and mechanisms for outputting information from the host system 104. These may include the monitor or graphical user interface 202, speakers, printers, infrared LEDs, and so on as well understood in the art.

The communication network interface 214 provides an interface to communication networks (e.g., video distribution network 102) and devices external to the host system 104. The communication network interface 214 may serve as an interface for receiving data from and transmitting data to other systems. Embodiments of the communication network interface 214 may include an Ethernet interface, a modem (telephone, satellite, cable, ISDN), (asynchronous) digital subscriber line (DSL), FireWire, USB, a wireless communication interface such as Bluetooth or WIFI, a near field communication wireless interface, a cellular interface, and the like.

The communication network interface 214 may be coupled to the video distribution network 102 via an antenna, a cable, or the like. In some embodiments, the communication network interface 214 may be physically integrated on a circuit board of the host system 104, or in some cases may be implemented in software or firmware, such as "soft modems", or the like.

The computing device 200 may include logic that enables communications over a network using protocols such as HTTP, TCP/IP, RTP/RTSP, IPX, UDP and the like.

The volatile memory 212 and the non-volatile memory system 216 are examples of tangible media configured to store computer readable data and instructions to implement various embodiments of the processes described herein. Other types of tangible media include removable memory (e.g., pluggable USB of SD memory devices, mobile device SIM cards), semiconductor memories such as flash memories, networked storage devices, and the like. The volatile memory 212 and the non-volatile memory system 216 may be configured to store the basic programming and data constructs that provide the functionality of the disclosed processes and other embodiments thereof that fall within the scope of the present invention.

Host system logic 110 that implements embodiments of the present invention may be stored in the volatile memory 212 and/or the non-volatile memory system 216. Said host system logic 110 may be read from the volatile memory 212 and/or non-volatile memory system 216 and executed by the processor(s) 204. The volatile memory 212 and the non-volatile memory system 216 may also provide a repository for storing data and instructions used by the host system logic 110.

The volatile memory 212 and the non-volatile memory system 216 may include a number of memories including a main random access memory (RAM) for storage of instructions and data during program execution and a read only memory (ROM) in which read-only non-transitory instructions are stored. The volatile memory 212 and the non-volatile memory system 216 may include a file storage subsystem providing persistent (non-volatile) storage for instructions and data. The volatile memory 212 and the non-volatile memory system 216 may include removable storage systems, such as removable flash memory.

The bus subsystem 218 provides a mechanism for enabling the various components and subsystems of host system 104 communicate with each other as intended. Although the bus subsystem 218 a communication network interface 214 are depicted schematically as each being a single bus, some embodiments of the bus subsystem 218 and/or communication network interface 214 may utilize multiple distinct busses.

It will be readily apparent to one of ordinary skill in the art that the computing device 200 may be a device such as a smartphone, a desktop computer, a laptop computer, a rack-mounted computer system, a computer server, or a tablet computer device, among other possibilities. As commonly known in the art, the computing device 200 may be implemented as a collection of multiple networked computing devices. Further, the computing device 200 will typically include operating system logic (not illustrated), applications, and other logic the types and nature of which are well known in the art.

Figure 3:
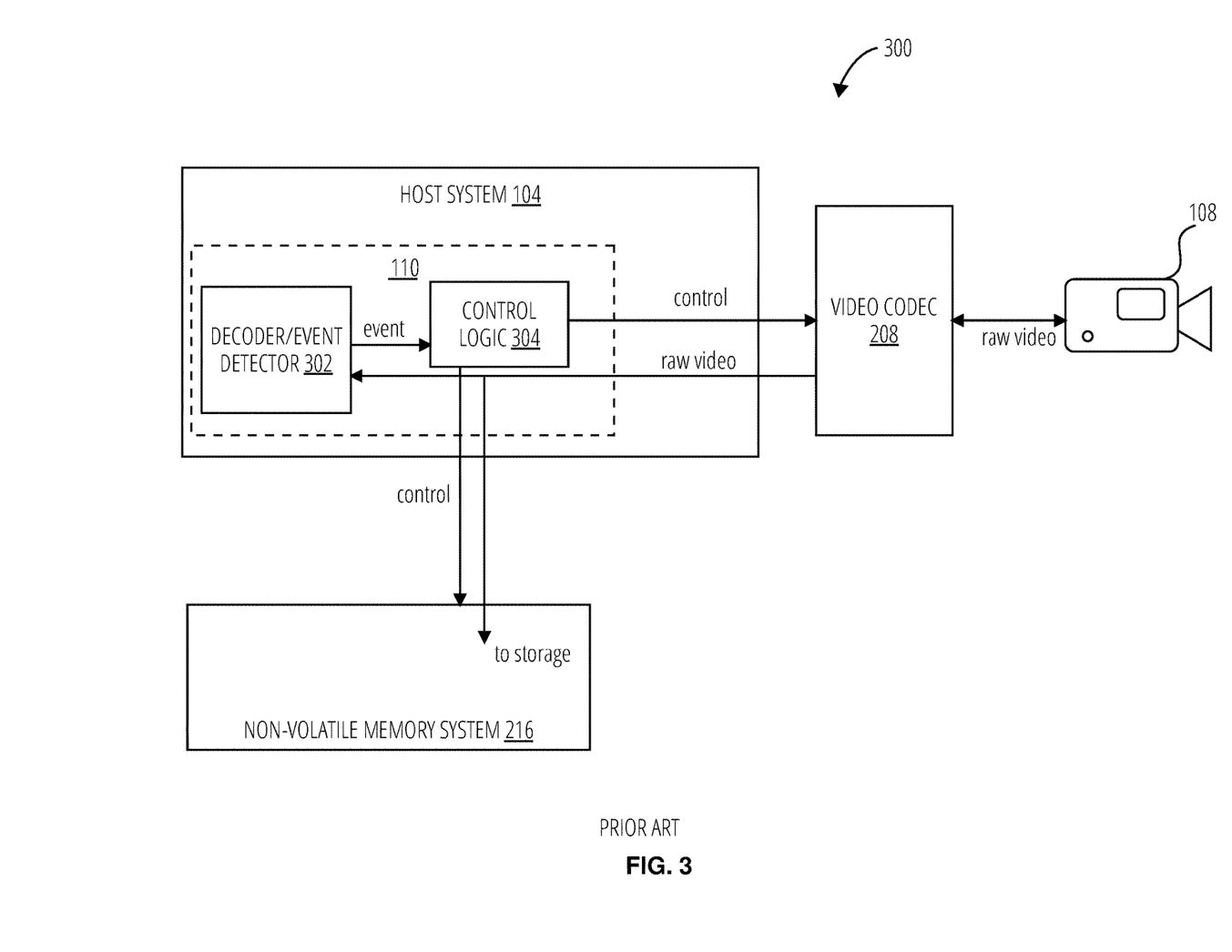
FIG. 3 illustrates a video recording system 300 in accordance with one embodiment.

FIG. 3 illustrates a conventional video recording system 300 in one embodiment. In addition to elements already introduced, the video recording system 300 comprises a decoder/event detector 302 and host system-based control logic 304. A decoder refers to logic to reverse the encoding of data to recover the raw, unencoded data. Control logic refers to logic to generate signals to control other logic and thus control logic may in some cases control other control logic. Although illustrated separately the non-volatile memory system 216 may be part of the host system 104 either integrally or as a plug-in device.

The video camera 108 and video codec 208 generate a raw video stream that is received by the decoder/event detector 302 of the host system 104. The decoder/event detector 302 detects an event which is provided to the host system-based control logic 304 which in turn controls the video codec 208 or video camera 108. Concurrently the raw video stream is stored to the non-volatile memory system 216 by the host system 104.

Figure 4:
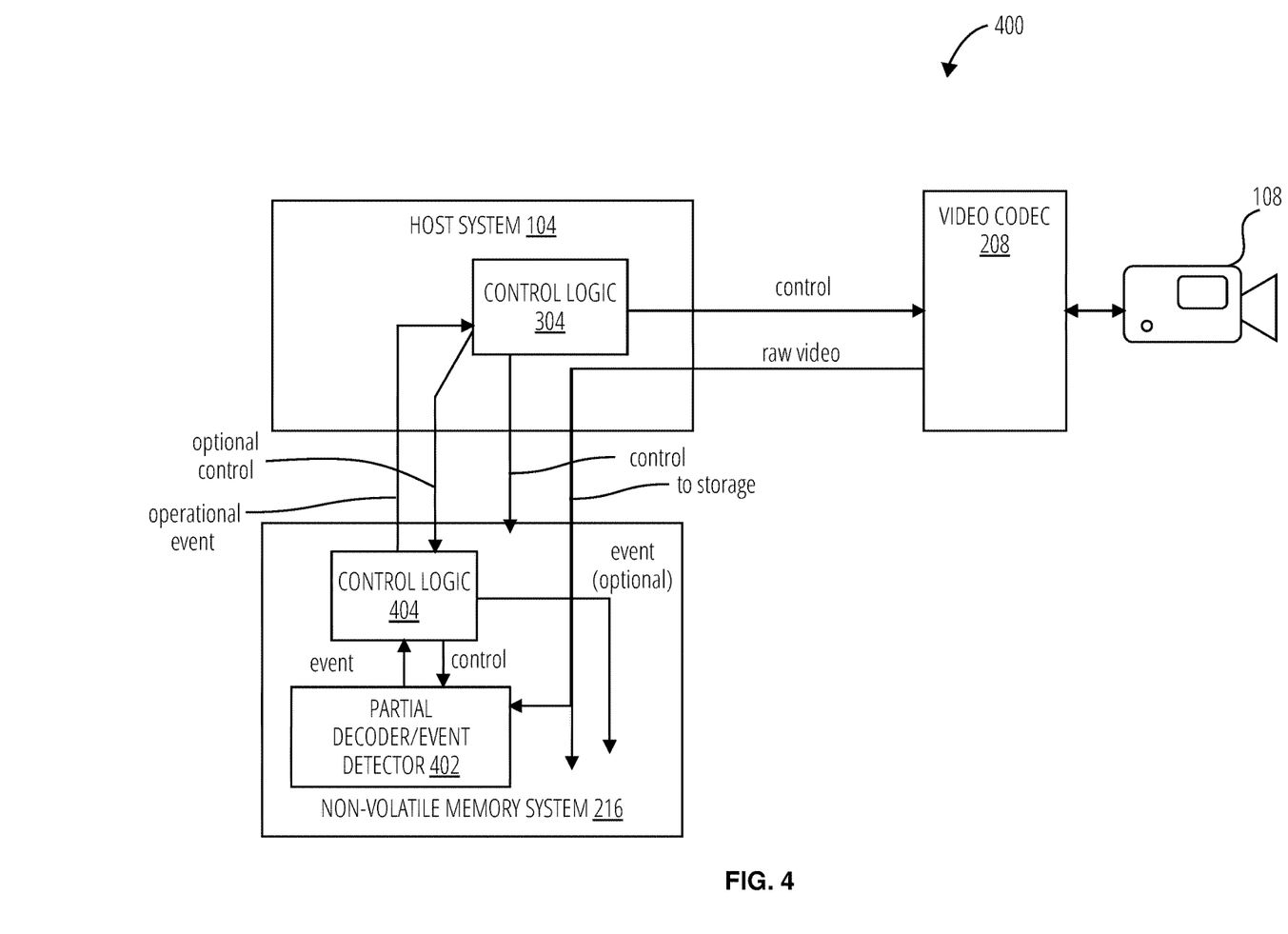
FIG. 4 illustrates a video recording system 400 in accordance with one embodiment.

FIG. 4 illustrates a video recording system 400 in one embodiment. In addition to features already introduced, the video recording system 400 the non-volatile memory system 216 includes a partial decoder/event detector 402 and a memory system-based control logic 404. A partial decoder refers to logic to partially decode raw video, as opposed to a decoder (implicitly, a full decoder) that performs a full decoding of the video. A partial decoder may analyze only a subset of frames and/or may only perform decoding sufficient to detect particular events. A decoder may be indicated as a partial decoder by context, for example if the decoder is described as partially decoding a raw video stream.

The partial decoder/event detector 402 may for example be implemented as processor-executable instructions in a volatile memory or non-volatile memory of the non-volatile memory system 216 (the non-volatile memory system 216 will typically include some volatile memory as well as, typically, a larger capacity of non-volatile memory). Alone, or together with the memory system-based control logic 404, the partial decoder/event detector 402 may thus implement event detection logic. Event detection logic refers to logic to detect events such as objects, motion, faces, and combinations thereof, in video. Object recognition refers to the detection of particular objects (inanimate or animate) in video. The partial decoder/event detector 402 and memory system-based control logic 404 may also be at least partially implemented in hardware, e.g., as integrated circuit, FPGA, etc.

In some embodiments the event detection logic is configurable with a frame-to-frame delta threshold indicative of an event and/or an operational event. An operational event refers to an event associated with taking a control action on a video camera or video codec. A frame-to-frame delta refers to a quantitative or qualitative metric of differences between video frames. Operational events may include operational events to undo settings to a video codec or camera made in response to a prior operational event.

The partial decoder portion of the partial decoder/event detector 402 may also be configurable with a desired level of decoding to perform on the raw video stream, e.g., how many frames to analyze of the incoming raw video stream and to what resolution.

Figure 6:
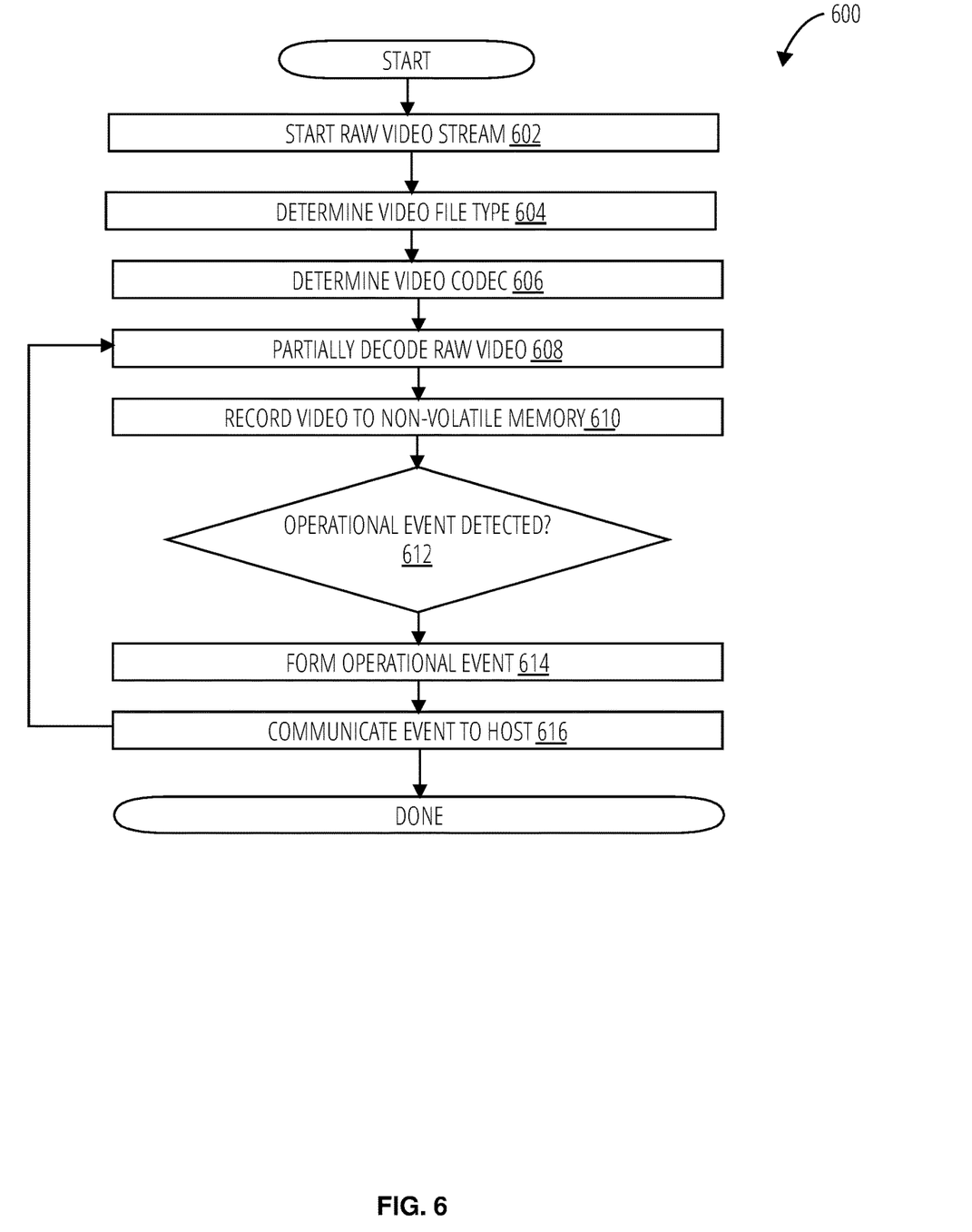
FIG. 6 illustrates a video recording and control process 600 in accordance with one embodiment.

An embodiment of a video recording and control process 600 utilizing the video recording system 400 is explained in more detail in conjunction with FIG. 6.

Utilizing the video recording system 400 design enables the host system-based control logic 304 to be backward-compatible with conventional approaches. In other words, the host system-based control logic 304 may be unmodified or substantially unmodified from the host system-based control logic in conventional video recording systems.

The control signals from the host system-based control logic 304 to the memory system-based control logic 404 may include signals to control, for example, the extent of decoding to be performed by the partial decoder/event detector 402 in order to meet performance requirements of the implementation, events for the partial decoder/event detector 402 to detect, operational events to be reported to the host system-based control logic 304, performance, threshold, and other control factors.

In one embodiment all of the raw video stream from the video codec 208 is stored by the non-volatile memory system 216. In other implementations, the host system 104 may control the extent to which the raw video stream is stored.

Certain video codecs (e.g., the MPEG class of video codecs) utilize a set of frames referred as Group of Pictures (GOP) that is a sequence of frames starting with an I frame followed by one or more P frames. Each P frames utilizes temporal compression that represents differences from a preceding I frame and are usually low on entropy when there is no motion in the raw video stream. Thus comparing the entropy in a P frame (or B frame) with a frame-to-frame delta threshold provides a manner of event detection with only partial decoding of the raw video stream. Another partial decoding technique is to decode P frames (or B frames) on a periodic basis, the period of which may be configurable.

The period for partially decoding I frames or P frames (or B frames) may be dynamically configured according to run-time factors such as available processing resources of the non-volatile memory system and/or performance requirements for event detection.

In yet another variation, the video codec may be configured (either by the host system or the non-volatile memory system) to encode only I frames, and the event detection logic of the non-volatile memory system may determine the frame-to-frame delta of successive or periodic I frames and generate events to the host system based on the frame-to-frame delta exceeding a threshold.

The events to the host can be raised through one or more mechanisms, e.g., hardware interrupts, extension to storage/memory commands typically used between the host and the non-volatile memory system 216, etc. In one or more embodiments, the partial decoding may use volatile memory within the non-volatile memory system 216 during the decoding process. If the non-volatile memory system 216 lacks sufficient volatile memory, in one embodiment, the host's volatile memory may be used, e.g., as supported by the NVMe interface.

In some embodiments the operational event sent to the host may include an event indicating that a previous operational event condition no longer exists. For example, the non-volatile memory system may generate an operational event to the host system indicating that a previously detected motion, object, face, etc. is no longer being detected. The host system may respond by reversing the video camera control for the previous operational event, e.g., lowering the resolution of the video codec, zooming back to a wider angle, changing a tilt or pan setting, etc.

Figure 5:
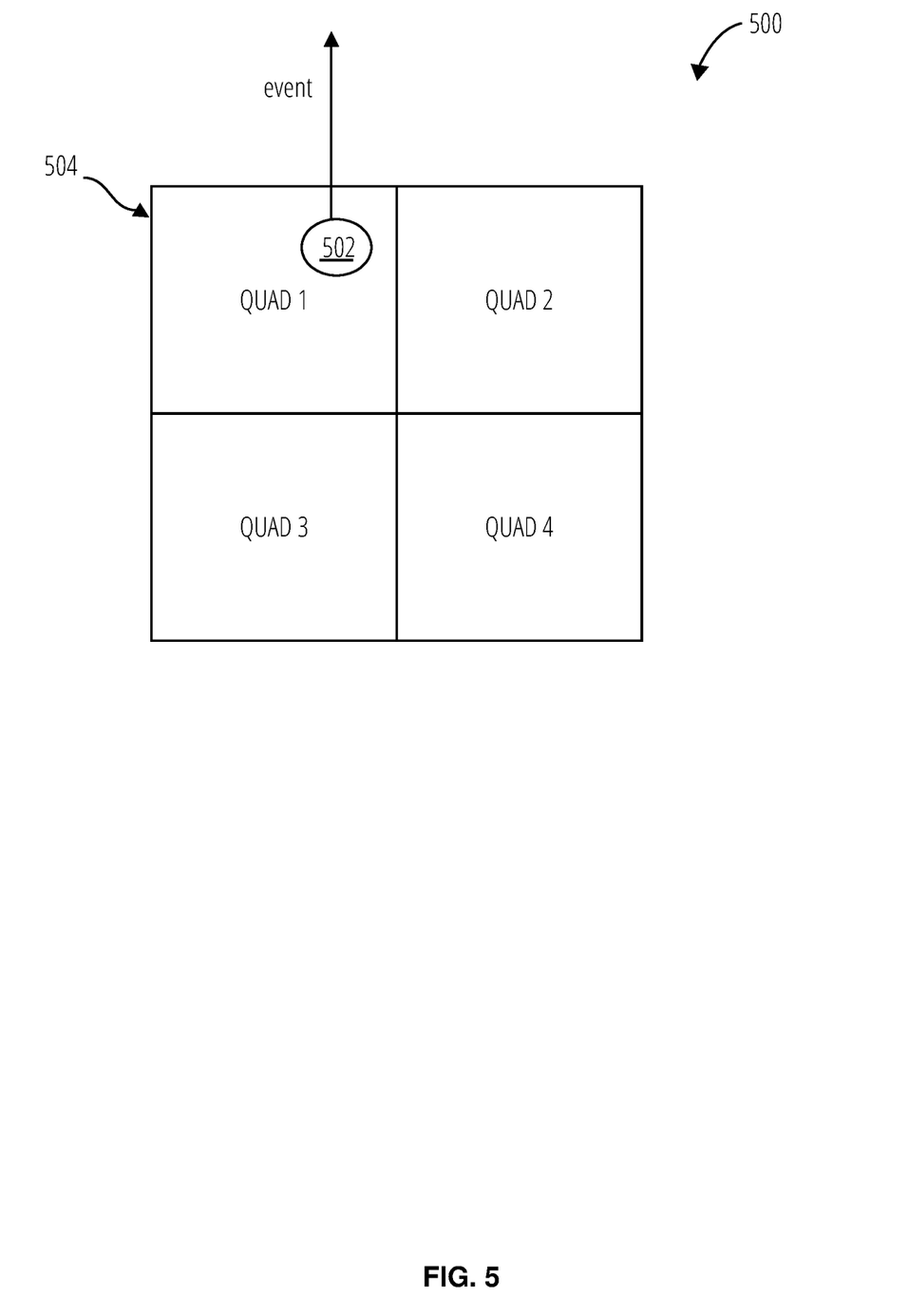
FIG. 5 illustrates a video frame 500 in accordance with one embodiment.

By way of example an event may include the video quadrant 504 and event coordinates 502 (e.g., cartesian or polar event coordinates) within the video quadrant 504 to which the video camera 108 or video codec 208 should focus, tilt, zoom, or sample at a higher video resolution. Event coordinates refer to data specifying a spatial location of an event detected in video. In some cases event coordinates may also specify a temporal location (e.g., a frame) of the event. A video quadrant is a group of macro blocks that exactly or approximately forms a Cartesian quadrant in a video frame. A macro block refers to a grouping of samples used by video codecs based on linear block transforms, such as certain MPEG codecs and certain H.26x codecs.

The event may in some cases further include an indication of the video frame 500, and type of event, such as object or human identification or motion, facial recognition, and the like. The type of events detected and generated may vary according to the needs of a particular implementation.

While the description herein focuses on encoded video data, the partial decoding and event trigger mechanism may be used on for other encoded data, such as audio data.

FIG. 6 illustrates a video recording and control process 600 in one embodiment. At action 602 the raw video stream is started. The system logic (e.g., the partial decoder/event detector 402 or memory system-based control logic 404) determines the video file type and video codec type for the raw video stream (action 604 and action 606). At action 608 partial video decoding begins, and in one embodiment, can continue for as long as the raw video stream is received. In other embodiments, the partial decoding can be activated as needed or as pre-configured. The raw video stream is also recorded to non-volatile memory (action 610). If an operational event is detected (decision action 612), for example if a frame-to-frame delta between I frames or P frames or B frames or any combination thereof exceeds a configured frame-to-frame delta, an operational event is formed at action 614 and the operational event is communicated to the host system at action 616. In this manner, video that is typically recorded into non-volatile memory can be analyzed in line as part of the memory write process without host involvement, and event notification can be triggered based on the partial decoding mechanism described herein. In other embodiments, the partial decoding and event trigger mechanism may be performed as part of other data operations, such as read, data copy, data migration, data refresh, garbage collection, etc.

In certain embodiments, the system logic (e.g., the partial decoder/event detector 402 or memory system-based control logic 404) could be implemented in a device separate from the non-volatile memory system 216. For example it could be part of a device (e.g., router, bus, bridge) that handles/ manages data transport among the host, the memory system, and/or source of data such as a surveillance system.

Example Memory Device

Figure 7:
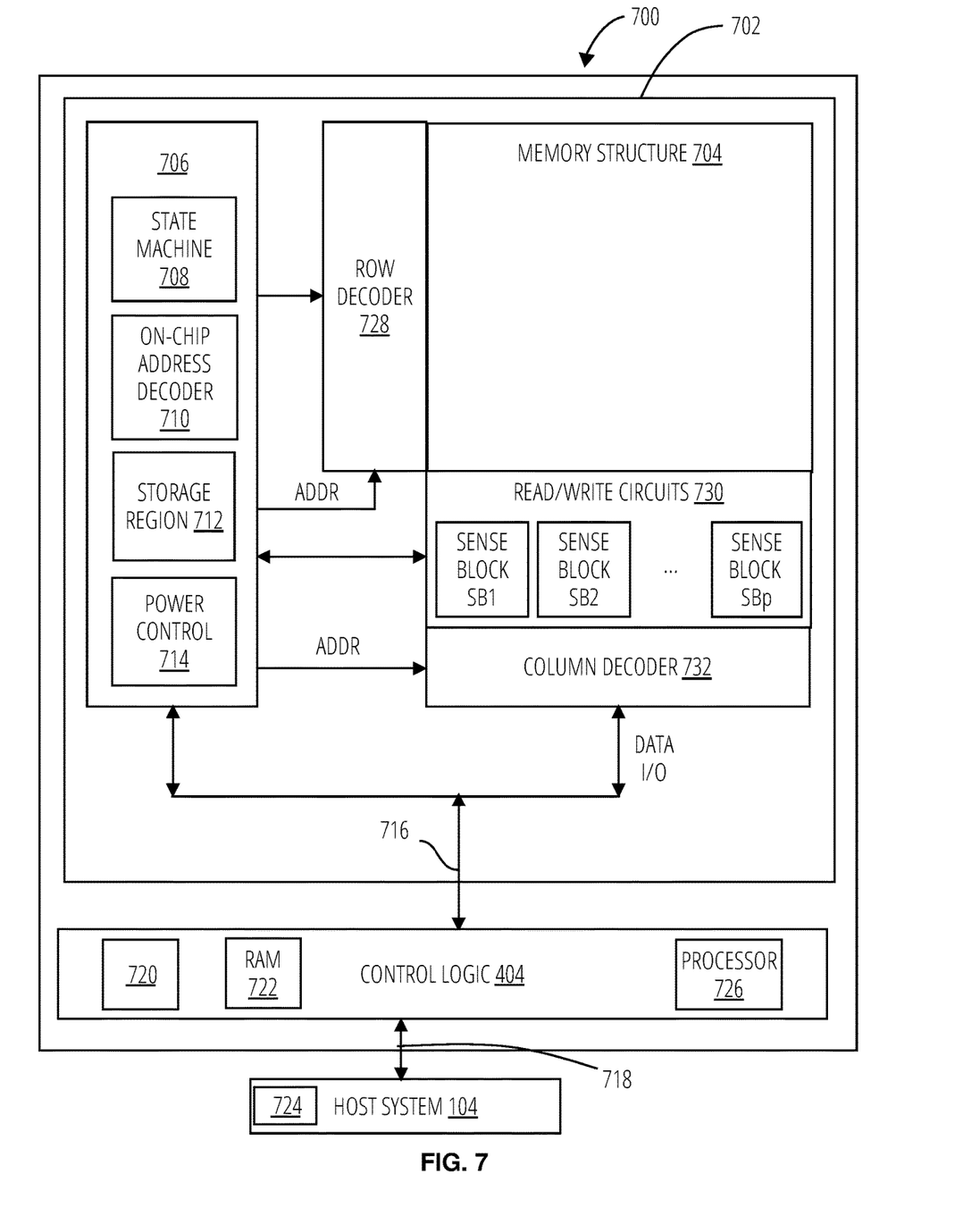
FIG. 7 is a block diagram of an example non-volatile memory system 700.

FIG. 7 is a block diagram of an exemplary non-volatile memory system 700. The non-volatile memory system 700 may include one or more memory die 702. The memory die 702 includes a memory structure 704 of memory cells, such as an array of memory cells herein referred to as a memory array, address controller 706, and read/write circuits 730. The memory structure 704 is addressable by word lines via a row decoder 728 and by bit lines via a column decoder 732. The read/write circuits 730 include multiple sense blocks SB1, SB2, . . . , SBp (sensing circuitry) and allow a page of memory cells to be read or programmed in parallel. Typically the memory system-based control logic 404 is included in the same non-volatile memory system 700 (e.g., a removable storage card) as the one or more memory die 702. Control commands and data (e.g., a raw video stream) are transferred between the host system 104 and memory system-based control logic 404 via a data bus 718, and between the controller and the one or more memory die 702 via lines 716. The data bus 718 may for example be a PCIe serial memory bus.

The memory structure 704 can be 2D (laid out in a single fabrication plane) or 3D (laid out in multiple fabrication planes). The memory structure 704 may comprise one or more array of memory cells including a 3D array. In one embodiment, the memory structure 704 may comprise a monolithic three-dimensional memory structure (3D array) in which multiple memory levels are formed above (and not in) a single substrate, such as a wafer, with no intervening substrates. The memory structure 704 may comprise any type of non-volatile memory that is monolithically formed in one or more physical levels of arrays of memory cells having an active area disposed above a silicon substrate. The memory structure 704 may be in a non-volatile memory device (e.g. Non-volatile memory system 700) having circuitry associated with the operation of the memory cells, whether the associated circuitry is above or within the substrate.

The address controller 706 cooperates with the read/write circuits 730 to perform memory operations on memory cells of the memory structure 704, and includes a state machine 708, an address decoder 710, and a power control 714. The state machine 708 provides control of memory operations. A store region selector 712 may be provided, e.g., for programming parameters as described further below.

The address decoder 710 provides an address interface between that used by the host or a memory system-based control logic 404 to the hardware address used by the row decoder 728 and column decoder 732. The power control 714 controls the power and voltages supplied to the various control lines during memory operations. The power control 714 and/or read/write circuits 730 can include drivers for word lines, source gate select (SGS) transistors, drain gate select (DGS) transistors, bit lines, substrates (in 2D memory structures), charge pumps, and source lines. The sense blocks can include bit line drivers and sense amplifiers in one approach.

An SGS transistor is a select gate transistor at a source end of a memory string, and a DGS transistor is a select gate transistor at a drain end of a memory string.

In some implementations, some of the components can be combined. In various designs, one or more of the components (alone or in combination), other than memory structure 704, can be thought of as at least one control circuit or controller which is configured to perform the techniques described herein. For example, a control circuit may include any one of, or a combination of, address controller 706, state machine 708, address decoder 710, column decoder 732, power control 714, control processor 726, sense blocks SB1, SB2, . . . , SBp, read/write circuits 730, memory system-based control logic 404, and so forth.

The memory system-based control logic 404 may comprise a control processor 726 and memory devices such as controller read-only memory 720 and controller volatile memory 722.

The memory devices of the memory system-based control logic 404 may comprise code such as a set of instructions, that configure the control processor 726 to execute the set of instructions to provide aspects of the functionality described herein. Alternatively or additionally, the control processor 726 can access code from the memory structure 704, such as a reserved area of memory cells in one or more word lines.

For example, code can be used by the memory system-based control logic 404 to access the memory structure 704, controller read-only memory 720, or controller volatile memory 722 for partial decoding and/or event detection logic. In some embodiments the control logic may utilize the host system volatile memory 724 for caching some or all of the raw video stream for partial decoding and event detection, using for example direct memory access technology (DMA) over the data bus 718. The control logic may further include drivers to perform basic tasks such as controlling and allocating memory, prioritizing the processing of instructions, and controlling input and output ports.

Generally, the control logic can include software and other logic (e.g., circuits, firmware) to perform the functions described herein. The control logic may comprise a sequencer to control the timing (start and stop times, durations, spacing etc.) of the various signals described herein. The state machine 708 may also be utilized to implement aspects of the control logic.

In one embodiment, the host system 104 is a computing device (e.g., laptop, desktop, smartphone, tablet, digital camera) that includes one or more processors, one or more processor readable storage devices (host system volatile memory 724, ROM, flash memory, hard disk drive, solid state memory) that store processor readable code (e.g., software) for programming the one or more processors to perform aspects of the techniques described herein. The host system 104 may also include additional system memory, one or more input/output interfaces and/or one or more input/ output devices in communication with the one or more processors, as well as other components well known in the art.

The store region selector 712 may be a non-volatile memory such as NAND flash memory, or another type. The store region selector 712 identifies blocks of the memory structure 704 for reading and writing, among other things, as known in the art.

One of skill in the art will recognize that the non-volatile memory system 700 is an example and that various implementations will include additional components, or exclude or combine some of the illustrated components, in manners known in the art.

Terms used herein should be accorded their ordinary meaning in the relevant arts, or the meaning indicated by their use in context, but if an express definition is provided, that meaning controls.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A non-volatile memory system comprising:
    a volatile memory;
    a non-volatile memory; and
    a controller configured to:
        receive an encoded video stream from a host for storage in the non-volatile memory;
        prior to storing the encoded video stream in the non-volatile memory:
            partially-decode the encoded video stream;
            determine whether there is enough space in the volatile memory to store the partially-decoded version of the encoded video stream in the volatile memory;
            in response to determining that there is enough space in the volatile memory to store the partially-decoded version of the encoded video stream in the volatile memory, store the partially-decoded version of the encoded video stream in the volatile memory;
            in response to determining that there is not enough space in the volatile memory to store the partially-decoded version of the encoded video stream in the volatile memory, store the partially-decoded version of the encoded video stream in a memory of the host;
            detect an operational event in the stored partially-decoded video stream; and
            inform the host of a location in a video frame of the detected operational event so the host can increase resolution in that location going forward; and
        store the encoded video stream in the non-volatile memory.

2. The non-volatile memory system of claim 1, wherein the operational event comprises object recognition.

3. The non-volatile memory system of claim 1, wherein the operational event comprises motion above a configured threshold.

4. The non-volatile memory system of claim 1, wherein the operational event comprises facial recognition.

5. The non-volatile memory system of claim 1, wherein the controller is further configured to use a configurable frame-to-frame delta.

6. The non-volatile memory system of claim 1, wherein the controller is further configured to perform a configurable amount of decoding.

7. A non-volatile memory system comprising:
    a non-volatile memory;
    means for receiving an encoded video stream from a host for storage in the non-volatile memory; and
    means for, prior to storing the encoded video stream in the non-volatile memory:
        partially-decoding the encoded video stream;
        detecting an operational event from the partially-decoded video stream; and
        informing the host of a location in a video frame of the detected operational event so the host can increase resolution in that location going forward, wherein the location comprises an identification of a quadrant and coordinates within the quadrant of the detected operational event.

8. The non-volatile memory system of claim 7, wherein the operational event comprises one or more of pan, tilt, zoom, and increased resolution.

9. The non-volatile memory system of claim 7, further comprising means for comparing frames of the partially-decoded video stream to a frame-to-frame delta threshold.

10. The non-volatile memory system of claim 7, further comprising an interface to communicate with the host.

11. The non-volatile memory system of claim 7, wherein the operational event comprises one or more of motion, object recognition, and facial recognition.

12. A method comprising:
    performing the following in a non-volatile memory system comprising a volatile memory and a non-volatile memory:
        receiving an encoded video stream from a host for storage in the non-volatile memory; and
        prior to storing the encoded video stream in the non-volatile memory:
            partially decoding the encoded video stream to generate partially-decoded video;
            determining whether there is enough space in the volatile memory to store the partially-decoded video in the volatile memory;
            in response to determining that there is enough space in the volatile memory, storing the partially-decoded video in the volatile memory;
            in response to determining that there is not enough space in the volatile memory, storing the partially-decoded video in a memory of the host;
            detecting an operational event in the stored partially-decoded video; and
            notifying the host of a location in a video frame of the detected operational event.

13. The method of claim 12, further comprising configuring the non-volatile memory system with an amount of partial decoding to perform.

14. The method of claim 12, further comprising configuring the non-volatile memory system with a frame-to-frame delta level signifying the operational event.

15. The method of claim 12, further comprising notifying the host of motion in the video stream.

16. The method of claim 12, further comprising notifying the host with event coordinates.

17. The method of claim 16, wherein the event coordinates comprise a subregion of the video frame and one or more of polar coordinates and Cartesian coordinates.

18. The method of claim 17, wherein the subregion comprises a video quadrant.

19. The method of claim 12, further comprising storing the video stream in the non-volatile memory.

* * * * *